H. JUNKERS.
INSTALLATION FOR WARM WATER SUPPLY.
APPLICATION FILED MAR. 19, 1914.
1,140,597.
Patented May 25, 1915.
2 SHEETS—SHEET 2.
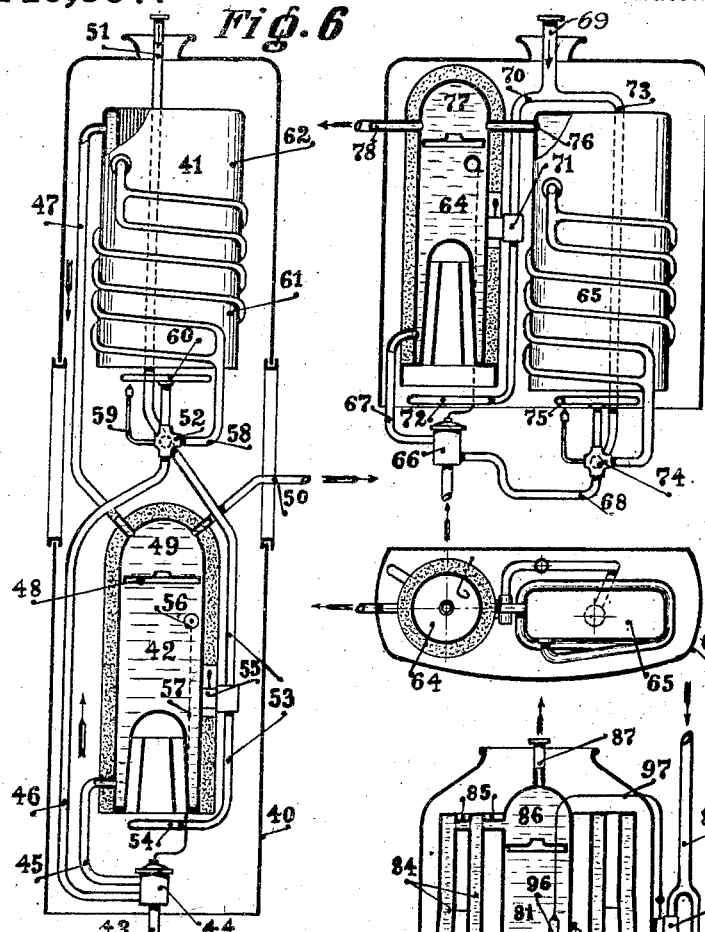
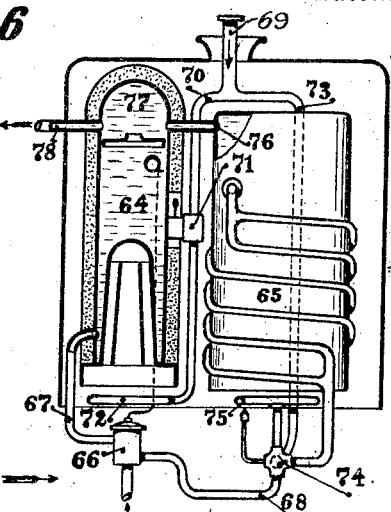
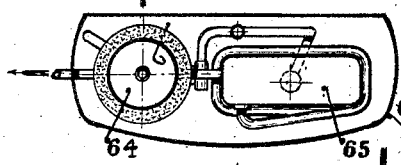
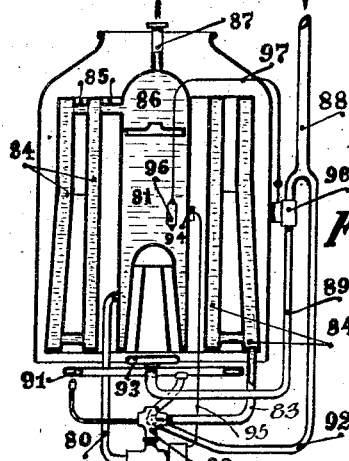
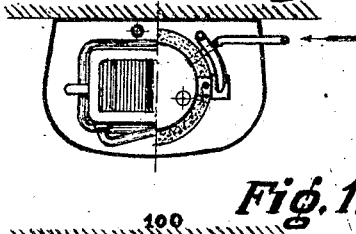
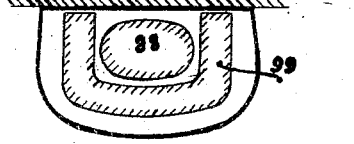
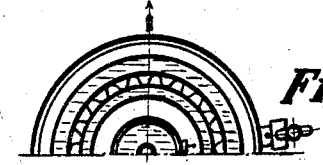
Witnesses:
L. Bates
C. B. Schroeder
Inventor:
Hugo Junkers
By Pennie Davis & Goldsburg
Attys.

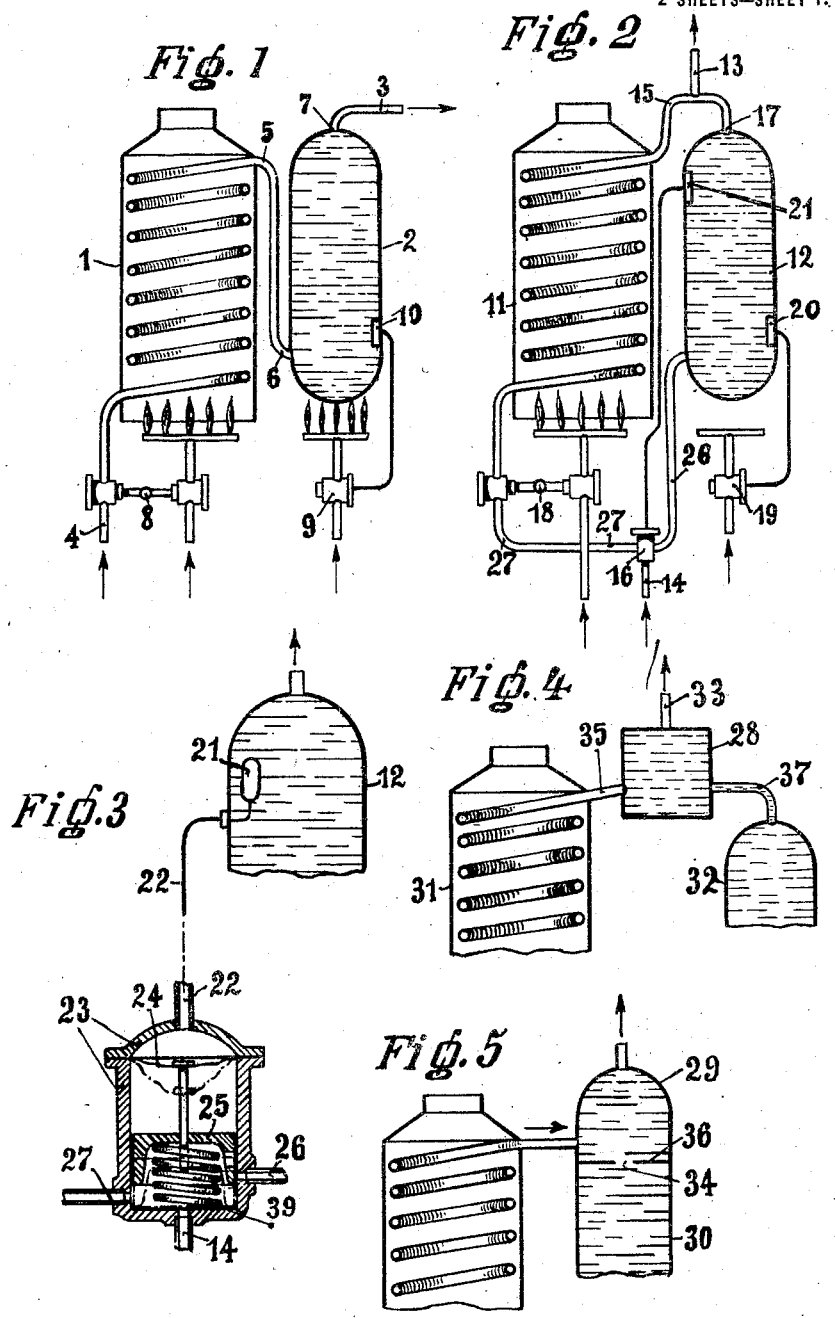

UNITED STATES PATENT OFFICE.

HUGO JUNKERS, OF AACHEN, GERMANY.

INSTALLATION FOR WARM-WATER SUPPLY.

1,140,597.   Specification of Letters Patent.   Patented May 25, 1915.

Application filed March 19, 1914. Serial No. 825,864.

*To all whom it may concern:*

Be it known that I, HUGO JUNKERS, a subject of the German Emperor, residing at and whose post-office address is Aachen, Frankenburg, Germany, have invented certain new and useful Improvements in Installation for Warm-Water Supply, of which the following is a specification.

The invention relates to an installation for warm water supply, especially for heating with gas, and in particular to an installation for producing warm water for central installation, for instance in houses and hotels.

The apparatus hitherto used for supplying warm water may be divided into two kinds. The first kind comprises the current heaters, in which a current of water is warmed when flowing through the heater, without any appreciable quantity of water being stored in the heater, so that the production of heat is always the same as the withdrawal of heat, as both always take place at the same time. The second kind comprises the storage heaters, in which a certain quantity of water is warmed in advance, so that the production and withdrawal of warm water do not take place at the same time and therefore do not need to correspond to each other at any particular moment. There are in the nature of these two types of apparatus quite a number of drawbacks which make themselves felt in accordance with the requirements of each particular case. The current heaters are in consequence of the lack of storage of heat not very suitable for cases where small quantities of water are often required quickly, such as for wash-stands, toilet rooms or in the kitchen for the preparation of food. On the other hand the storage heaters are not very suitable for supplying large quantities of water, especially when rarely required, such as for instance in baths, in the kitchen for the supply of warm water for washing up, or in the wash-kitchen; for large and expensive heaters are required to keep their comparatively large stores of water permanently warm, and they are expensive to work on account of the continuous loss of heat which takes place for long periods. The liquid-heaters hitherto known are therefore alone unsuitable for meeting satisfactorily the varied requirements of the warm water supply in houses and hotels. It is also impossible to obtain a satisfactory solution by simply combining a current heater and a storage heater, as this demands a double and therefore expensive system of pipes and discharge taps, or the various discharge taps must be connected either to the current heater or to the storage heater according to requirements, and finally because at such points of consumption where it very often happens that sometimes large quantities and sometimes small quantities of warm water are required either two different and easily interchangeable discharge taps must be provided and used, or by means of special change-over devices the taps must be connected sometimes to the storage heater and sometimes to the current heater.

The drawbacks are removed by the present invention by a combination of a current heater and a storage heater, having automatic regulating devices and the like, coupled together in their effect and manner of working, and connected to a single common system of pipes in such a manner that for instance the current heater supplies warm water to the consumption pipe either only when the storage heater has discharged its contents of warm water entirely or partially, or when there is a fitful demand for water which is considerable per unit of time.

By means of this new type of installation the drawbacks of both the older types of apparatus hitherto known are avoided and their individual advantages are united, while additional advantages are obtained, so that an installation is created which is very suitable for the central supply of warm water to consumption places of quite different kinds. For on removing small quantities of water the storage heater first supplies warm water from its store to the pipes where it is required, while the current heater which is less suitable for this purpose does not yet participate in the warm water supply. Only when great quantities of water are to be withdrawn after each other or when there is a great and sudden demand for warm water per unit of time, for instance when preparing a bath, does the current heater come into operation, so that it prepares warm water for the consumption pipe and delivers it to the consumption pipe either directly or via the storage heater. In the latter case the storage apparatus can if necessary be automatically stopped, so that its contents remain in reserve for small demands which may follow. This new central installation for producing warm water in accordance with the present invention possesses a number of advantages. The part thereof working as storage heater may in the first place be of smaller dimensions than would be necessary in the case of a similar installation with separate storage heater, as after its exhaustion the current heater always provides for the further supply of warm water, so that the warm water supply is never interrupted in spite of the smallness of the actual storage heater. Losses of heat are thereby also diminished. Of particular value is the simplification of the piping and taps and also of the manipulation, as only one tap device is necessary for the various purposes. This new arrangement is at the same time extremely economical in the consumption of fuel, as the larger current heater is generally inactive and therefore causes no loss at all, and the smaller storage heater occasions only the comparatively small losses due to radiation of heat.

The drawings show diagrams of several embodiments of the invention, as follows:—

Figures 1 and 2 show diagrammatically two different designs of an installation. Fig. 3 shows a detail. Figs. 4 and 5 show modifications of a part of the second design of an installation. Figs. 6-12 show other embodiments of the invention with parts of the heater apparatus arranged over each other, at the side of each other and inside each other.

In the first embodiment the current heater 1 and the storage heater 2 are disposed in line with each other and with the warm water consumption pipe 3. The cold water enters the current heater at 4 and leaves it at 5, then enters the storage heater at 6 and goes from it at 7 into the consumption pipe 3. The water thus flows first through the current heater 1, of which the burner is generally not open or only a little open and does not even open when a small current of water passes through. The water therefore then enters the storage heater 2 in a cold or only slightly warmed condition and is there completely heated and then supplied to the consumption pipe 3. When a small quantity of water is drawn off therefore the current heater supplies cold or only slightly warmed water to the storage heater 2. As soon however as a larger quantity of water is withdrawn from the storage heater, the current heater 1 comes into operation, so that it supplies hot water through the storage heater 2 to the consumption pipe. The starting of the gas heating of the current heater 1 takes place on opening a cock automatically by means of a valve in the gas pipe, which valve is connected by the coupling 8 with a suitable valve or the like in the water pipe 4 and is operated by the changes of pressure arising in the cold water pipe on the water flowing through. At the same time the arrangement of the valve controlled by the water is such that it only opens the gas valve when a large quantity of water is drawn off. This is effected, for instance, by a leakiness of the gear piston, by play of the valve rods or by arranging a counter stress (e. g. spring) which must first be overcome. If a small quantity of water is withdrawn from the storage heater the latter would in in time fill with cold water from the current heater. As soon however as this cold water reaches the regulating cap 10 the gas flame of the storage heater is automatically turned full on, so that the cold water supplied is warmed again in the storage heater. If on the other hand a large quantity of warm water is withdrawn from a tap the leak of the valve arranged at 4 does not suffice to permit a corresponding quantity of cold water to replace it. The admission of water is only possible if the valve opens and at the same time turns on the gas cock of the current heater. Then a quantity of water that has been partially warmed in the current heater enters the storage heater corresponding to the quantity of warm water that has been withdrawn, so that the storage heater can never be exhausted. The heating of the storage heater 2 is regulated in the manner known by a gas valve 9, the opening of which is made dependent on the temperature of the water in the storage reservoir 2 and for this purpose is connected with a regulating valve 10 which is sensitive to heat and is situated in the storage reservoir.

Another design and possibility of connection of the two parts of the heating apparatus is shown in Fig. 2. In this arrangement the water outlets 15 and 17 of the two heaters 11 and 12 are both connected directly to the consumption pipe 13; the heaters are thus disposed in parallel. The feeding of the heaters with water takes place from a common cold water pipe 14 by means of a valve 16 which only permits the water to enter when the warm water contained in the storage heater is for the most part exhausted. This arrangement has the advantage that the current heater 11 only comes into operation on the withdrawal of large quantities of water. The operation of the valve 16 may be effected for instance by the temperature of the water in the storage heater 12 with the use of known valve devices such as a cap 21 which is sensitive to heat and mechanic, hydraulic or pneumatic connections 22, as shown for instance in Fig. 3. Accordingly a cap 21 filled with a liquid that boils at a low temperature is placed in the upper part of the storage heater, and is in communication by means of a pipe 22 with a diaphragm casing 23. The valve piston 25 is connected to the diaphragm 24, and the weight of the former is balanced by a spring 26. If the water contained in the storage heater is warmed, the contents of the cap 21 boil, and the pressure which thereupon arises is transferred through the tube 22 into the diaphragm casing 23 and presses through the diaphragm downward. Thereupon the piston 25 is pressed down, so that the water inlet 27 to the current heater is closed and the water inlet 26 to the storage heater is opened. If water is now withdrawn from the consumption pipe 13, at first only the hot water situated in the storage heater 12 can flow to the tap, because to the same extent as warm water is withdrawn new cold water is supplied from below to the storage heater 12 by the valve 16 or 23. The current heater 11 at the same time supplies no water to the consumption pipe because it is closed from the fresh water supply by the piston slide valve 25. If so much hot water is drawn off that the cold water which replaces it rises up to the cap 21, the latter is cooled and the liquid in the tube 22 contracts, and the pressure on the diaphragm 24 is removed, so that this goes back with the piston 25 under the pressure of the spring 26. Thereby the inlet 26 to the storage heater is closed and the inlet 27 to the current heater is opened. Under the action of the water flowing in the pipe 27 the gas valve of the current heater is automatically opened by the coupling 18, so that the current heater now itself enters on the function of warming water and feeds the consumption pipe direct with warm water. The heating of the storage heater 12 is regulated as in the first form by a valve 19 which is thermally operated by the regulating part 20 of the storage heater which is sensitive to heat.

The design of the water control valve 16 may be of any kind; it can also have the form of a rotary slide valve or seat valve, and it can further be either built into the feed pipe at the point where it branches off to the two apparatus, as shown, or into the water consumption pipe at the point where the water outlets from both heaters unite.

As the current heater on coming into operation does not immediately supply hot water, it is advisable to provide a mixing chamber at the water outlet of both heaters. According to Fig. 4 such a mixing chamber 28 is arranged at the place where the water outlets 35 and 37 join. The storage heater 32 which first feeds the consumption pipe 33, first fills the mixing chamber 28 with hot water. As soon as the flow of water is transferred to the current heater 31, at first the colder water coming from the current heater is mixed in the mixing chamber 28 with the hot water contained therein and then flows in a warm condition through the pipe 33 to the tap.

In Fig. 5 the mixing chamber 29 is combined directly with the storage heater 30 in such a manner that the boiler of the storage heater is divided by a partition 36 provided with a passage 34 into two spaces, of which the upper space serves as mixing chamber.

In the form of installation shown in Figs. 6 and 7 a current heater 41 and a storage heater 42 are arranged co-axially over each other and inclosed in a common casing 40. Fig. 6 shows a vertical longitudinal section and Fig. 7 in the left half a horizontal section through the upper current heater and in the right half a horizontal section through the storage heater situated thereunder. The cold water comes through the pipe 43 to the distributing valve 44, which is constructed similarly to that shown in the design in Fig. 3, and according to its adjustment the water flows through the pipe 45 into the storage heater 42 or through the pipe 46 into the current heater 41 in the manner described below. The pipe 47 goes from the upper part of the current heater 41 to the upper mixing chamber 49, which is separated by an intermediate plate 48, in the actual storage heater boiler. The hot water which has arrived in the mixing chamber from the storage heater direct or by way of the current heater goes through the consumption pipe 50 to the places of consumption. The gas on the other hand comes in the back part of the casing from above through the pipe 51, then goes through the valve 52, which in the manner described above starts or stops the gas heating of the current heater. Pipe 51 is also connected by the pipe 53 to the burner 54 of the storage heater, which burns continually and is only regulated in respect of the size of its flame. The regulation of the size of the flame takes place by means of a throttle valve placed in the pipe 53, which is controlled by means of a cap 55 which is sensitive to heat and which is placed directly on the metal wall of the storage heater 42. At a still higher point a second cap 56 which is sensitive to heat is placed on the wall of the storage reservoir or reaches into it and operates the hydraulic connections of the distributing or reverse gear valve 44 that are indicated by the dotted line 57.

The gas pipe 51, 53 and the cold water pipe 46, 58 and connected to the valve casing 52 in the manner described above in connection with the parts 4 and 8 of Fig. 1, a continually burning ignition flame 59 and an opening and closing burner pipe 60 being fed from the gas pipe. The current heater has, in the example shown a rectangular cross section and a vertical combustion shaft 61 round which the water pipe 58 rises in two parallel spiral branches and an upper double-walled water shell part 62 into which the two spiral branches of the water pipe open, while a ribbed radiator is constructed inside. The hot water then goes, as already described, from the water shell part of the current heater through pipe 47 to the mixing chamber 49.

The method of working of the installation is accordingly as follows:—The cold water from the pipe 43 goes through the distributing valve 44, which stands at first in a position for sending water exclusively through pipe 45 into the storage heater 42 to fill the latter completely. The burner 54 of the storage heater also burns at first with full flame and at the same time heats the store of cold water by means of its flame which goes straight up into the flame shaft built into the storage heater, and the entire contents of the latter therefore gradually become hot. The cap 55 of the storage heater burner pipe 53, which is sensitive to heat, is also gradually warmed and as soon as it has reached the temperature provided by the adjustment, it throttles the flow of gas through the pipe 53 to such an extent that the quantity of gas reaching the burner 54 only suffices to keep the store of water hot. The apparatus remains in this condition until hot water is drawn off at the places of consumption. As soon as this takes place new cold water enters from below into the storage heater through the pipe 45 in order to replace the hot water withdrawn, and as soon as the cold water in the storage heater has again risen to the height of the cap 55, this reacts thereupon so as to open again the burner pipe of the storage heater for complete flow in order to heat the cold water that has entered the storage heater. If however the warm water consumption increases to such an extent that the cold water in the storage heater rises still further up to the cap 56, this reacts so as to change over the distributing valve 44 by means of the hydraulic connections 57, so that cold water now goes through the pipe 46, valve 52, current heater pipe 58 and water shell 62, and then as boiling water to the mixing chamber and through it to the places of consumption. In the current heater at first only the ignition flame 59 had been burning, but at the moment when the current of water begins to flow in the pipe 46, 58, the flow of water actuates the gas valve to admit gas to the burner pipe 60, so that the current heater can begin to function. As soon as the flow of the current in the current heater ceases, the burner of the current heater also stops on account of the construction of the automatic valve 52, and is again started as soon as water flows through again on account of very great consumption in the discharge pipe 50, whereas a small consumption, as already described, does not influence the current heater and is only met by the storage heater.

The form of the apparatus shown in Figs. 8 and 9 has the advantage over the above designs that its length is much less, which is attained by placing the two parts of the apparatus side by side. On the other hand the parts of the apparatus can be quite analogous or similar in their constructive arrangement. In the casing 63 is situated at the left the storage heater 64 in the form of a cylinder surrounded with heat insulation and at the right the rectangular current heater 65 consisting of the tube-cooled combustion chamber below and the water-heating double shell with interior ribbed body above. The cold water is generally conducted as above by means of the distributing valve 66, which is under the influence of a governing device that is sensitive to heat, through the pipe 67 into the storage heater and during great consumption through pipe 68 into the current heater. The gas pipe coming from 69 branches off and the left branch 70 after flowing through the valve 71, which is sensitive to heat and is dependent on the storage heater 64, goes to the burner 72 of the storage heater. The right branch 73 goes through the automatic valve 74 of the current heater to the burner 75 of the current heater, the valve 74 opening the passage when water flows through and closing it when the water stops. The method of working of this installation is exactly the same as in the preceding case. Generally only the storage heater functions, and when the water therein is hot its burner is turned quite low by throttling its heating pipe; when the cold water rises inside the burner is put on full; when the cold water rises still further the flow of water in the current heater is started by changing over the distributing valve 66. The water goes from the valve 66 through pipe 67, storage heater 64 to the mixing chamber 77 or through pipe 68, current heater 65, connecting pipe 76 to the mixing chamber 77, and thence through the pipe 78 to the place of consumption.

The form of the invention shown in Figs. 10 and 11 is still more compact than the above described forms. In this form both apparatus are built together concentrically so that the current heater surrounds the storage heater concentrically. The fresh cold water supplied is conducted through the distributing valve 79 either by means of the pipe 80 via the storage heater 81 into the mixing chamber 86 or by way of the automatic valve 82 and the pipe leading therefrom to the current heater which consists of two water-holding double shells 84 surrounding the storage heater concentrically; these shells communicate with each other and supply hot water through the connecting pipes 85 to the mixing chamber 86, whence it flows through the pipe 87 to the place of consumption. The heating gas pipe 88 branches off and one branch 89 goes through a regulating valve 90 which is sensitive to heat; this branch leads to the continually burning burner 93 under the storage heater 81. The other branch 92 of the gas pipe leads to the valve casing 82, from which a gas pipe leads to the burner 91 under the current heater 84. The burner 91 is provided with a continually burning ignition flame as shown. A thermostatic apparatus 94 which is arranged at about half the height of the storage heater controls the distributing valve 79 with the help of the hydraulic connections 95 in such a manner that the current of water goes to the storage heater as long as the consumption of warm water remains so small that the burner of the storage heater can effect the necessary heating capacity for warming the fresh cold water, but that the current of water is only conducted through the current heater when a greater heating capacity is required. Another thermostatic device 96 operates through the connection 97 to control valve 90 so that gas is supplied to the burner 93 in such quantity as is required for heating the water in the storage tank 81.

Fig. 12 finally shows the plan of an installation in which an elliptical storage heater 98 is surrounded on only three sides by a current heater 99 of incomplete rectangular form, while on the fourth side both parts of the apparatus are supported by a wall 100.

The invention is not restricted to the forms of execution of the central installation for warm water supply described and shown, but can be executed in various other ways. For instance the co-axial design in Fig. 6 can be altered so that the burner armatures and regulating valves of both parts of the apparatus are united at one place, preferably under the lower part of the apparatus. Likewise in the design in Fig. 8 both parts of the apparatus may be united in another relative position, e. g. with the current heater having its narrow side turned to the back wall or with storage heater placed before the broad surface of the current heater. Further in all designs the constructive execution of the parts of the apparatus may vary; for instance in the design in Figs. 6 and 8, instead of the construction consisting of a tube-cooled combustion chamber and an upper rib-filled double shell box, the type of storage heater shown in Fig. 10 can be used having water-holding double shells or chambers with or without connecting laminæ, ribs and the like; likewise in the design in Fig. 10 the type of current heater shown in Figs. 6 and 8 can be used. Likewise combinations of both constructions or of still other constructions are also possible. It is evident that in the same manner the storage heater can be constructed otherwise than in the examples shown. Likewise alterations may be made in the arrangement of the pipes of both parts of the apparatus and their armature valves, etc., some of which are indicated by the first five figures and the text concerning them. Naturally the hydraulic connections shown can be replaced by pneumatic or mechanical connections.

What I claim is:

1. Water heating apparatus comprising the combination of a current heater for heating water flowing through it, a storage heater for heating water stored therein, heating devices for said heaters and a discharge pipe for withdrawing water from the heaters so arranged that water drawn therethrough will be supplied initially by the storage heater and thereafter by the current heater; substantially as described.

2. Water heating apparatus comprising the combination of a current heater for heating water flowing through it, a storage heater for heating water stored therein, heating devices for the heaters, automatic regulating means for the heating devices, a discharge pipe connected to the heaters and automatic means for causing water supplied through the discharge pipe to be drawn first from the storage heater and afterward from the current heater; substantially as described.

3. Water heating apparatus comprising the combination of a current heater for heating water flowing through it, a storage heater for heating water stored therein, heating devices, thermostatic controlling means for the heating devices, a discharge pipe connected to said heaters and thermostatic controlling means for causing water supplied through the discharge pipe to be drawn first from the storage heater and afterward from the current heater; substantially as described.

4. Water heating apparatus comprising the combination of a current heater for heating water flowing through it, a storage heater for heating water stored therein, heating devices for the heaters, a water supply pipe connected to the heaters, means for controlling the supply of water from said pipe to one or the other of said heaters, and a discharge pipe connected to the heaters for conveying water therefrom; substantially as described.

5. Water heating apparatus comprising the combination of a current heater for heating water flowing through it, a storage heater for heating water stored therein, heating devices for the heaters, a water supply pipe connected to the heaters, a valve in said pipe controlling the flow of water from the pipe to one or the other of said heaters, a thermostat in the storage heater controlling said valve and a discharge pipe connected to the heaters for withdrawing water therefrom; substantially as described.

6. Water heating apparatus comprising the combination of a current heater for heating water flowing through it, a storage heater for heating water stored therein, heating devices for said heaters and piping connected to the heaters for causing water to flow first through the current heater and then through the storage heater; substantially as described.

7. Water heating apparatus comprising the combination of a current heater for heating water flowing through it, a storage heater for heating water stored therein, pipes for carrying water to and from the heaters, heating devices for the heaters, means for automatically regulating the heating device for the current heater in accordance with the speed of admission of water to the current heater and automatic means for causing water drawn from the heaters to be supplied first from the storage heater and afterward from the current heater; substantially as described.

8. Water heating apparatus comprising the combination of a current heater for heating water flowing through it, a storage heater for heating water stored therein, piping for conveying water to and from the heaters, heating devices for the heaters, a thermostat in the storage heater for regulating the heating device for that heater, and automatic means for causing water drawn from the heaters to be supplied first from the storage heater and afterward from the current heater; substantially as described.

9. Water heating apparatus comprising the combination of a current heater for heating water flowing therethrough, a storage heater for heating water stored therein, heating devices for said heaters, a mixing chamber connected to the heaters, a discharge pipe connected to the mixing chamber and means for causing water drawn from the apparatus to be supplied first from the storage heater and afterward from the current heater; substantially as described.

10. Water heating apparatus comprising the combination of a storage heater for heating water stored therein, a current heater for heating water flowing therethrough, annular in form and encircling the storage heater, heating devices for the two heaters, automatic controlling means for the heating devices, a water supply pipe connected to the two heaters, a discharge pipe connected to the two heaters and automatic thermostatically controlled devices for regulating the flow of water through the two heaters; substantially as described.

In testimony whereof I affix my signature in presence of two witnesses.

HUGO JUNKERS.

Witnesses:
  WOLDEMAR HAUPT,
  HENRY HASPER.